United States Patent [19]
Byerly

[11] 3,837,472
[45] Sept. 24, 1974

[54] TRANSFER APPARATUS
[75] Inventor: Dale L. Byerly, Toledo, Ohio
[73] Assignee: Champion Spark Plug Company, Toledo, Ohio
[22] Filed: Feb. 2, 1973
[21] Appl. No.: 329,133

[52] U.S. Cl. ............................ 198/218, 214/1 BT
[51] Int. Cl. ............................................ B65g 25/04
[58] Field of Search ......... 198/218; 214/1 BZ, 1 BS, 214/2; 271/85

[56] References Cited
UNITED STATES PATENTS
1,501,602  7/1924  Holmes .......................... 198/218 X
3,225,891  12/1965  Hickin et al. ................. 214/1 BT X
3,703,834  11/1972  Beezer .......................... 214/1 BB Primary Examiner—Richard A. Schacher
Assistant Examiner—Douglas D. Watts
Attorney, Agent, or Firm—Owen & Owen

[57] ABSTRACT

The invention is a transfer apparatus for moving a plurality of spaced articles between a linear path and an arcuate path or between an arcuate path and a linear path and at the same time changing the spacing between the articles. A first cam is attached to a rotatable shaft. The first cam supports a lower cam and a lower guide plate. Pick-up heads are moved in response to the cam paths and are horizontally translated along guide slots in the guide plate.

11 Claims, 12 Drawing Figures

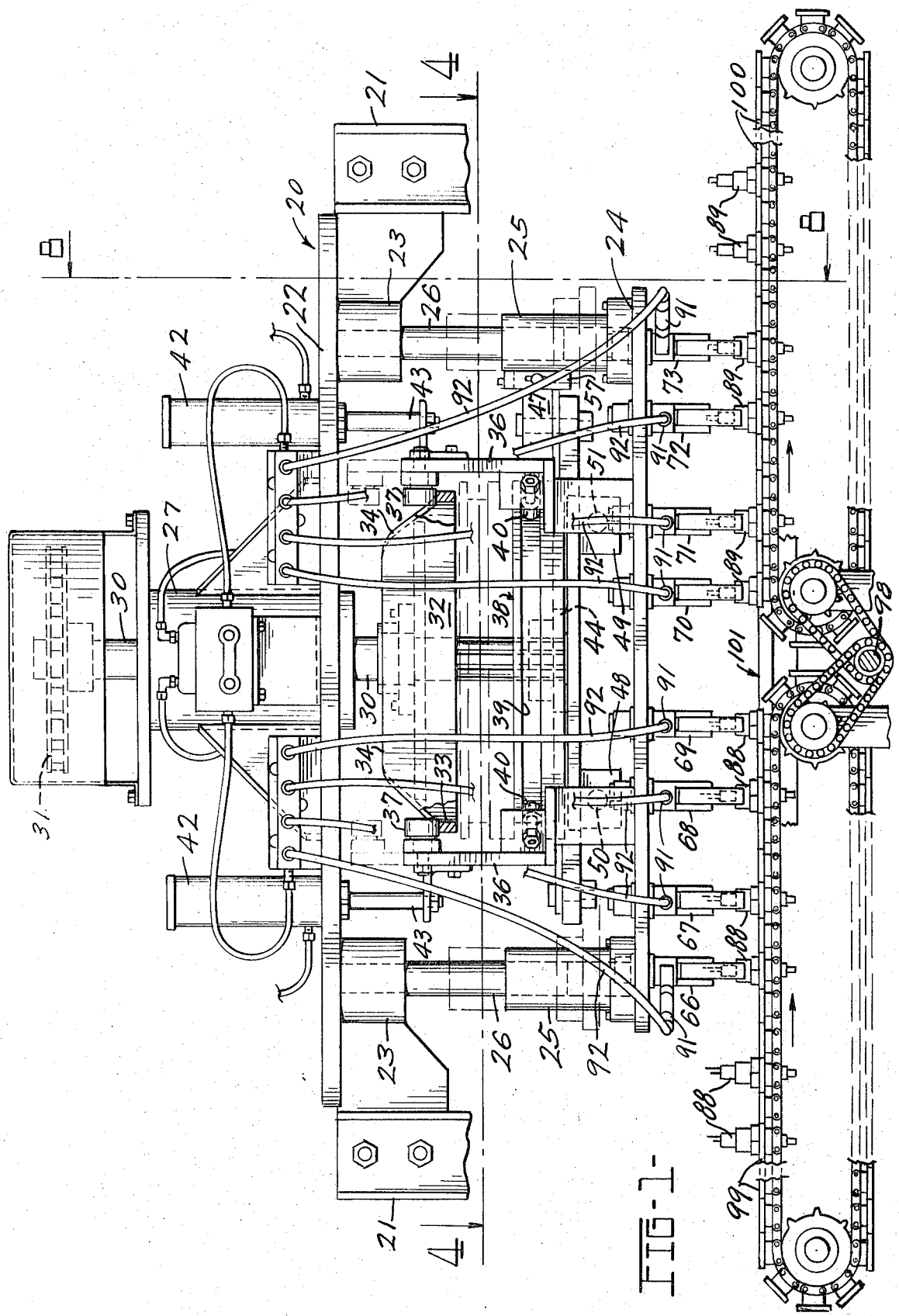

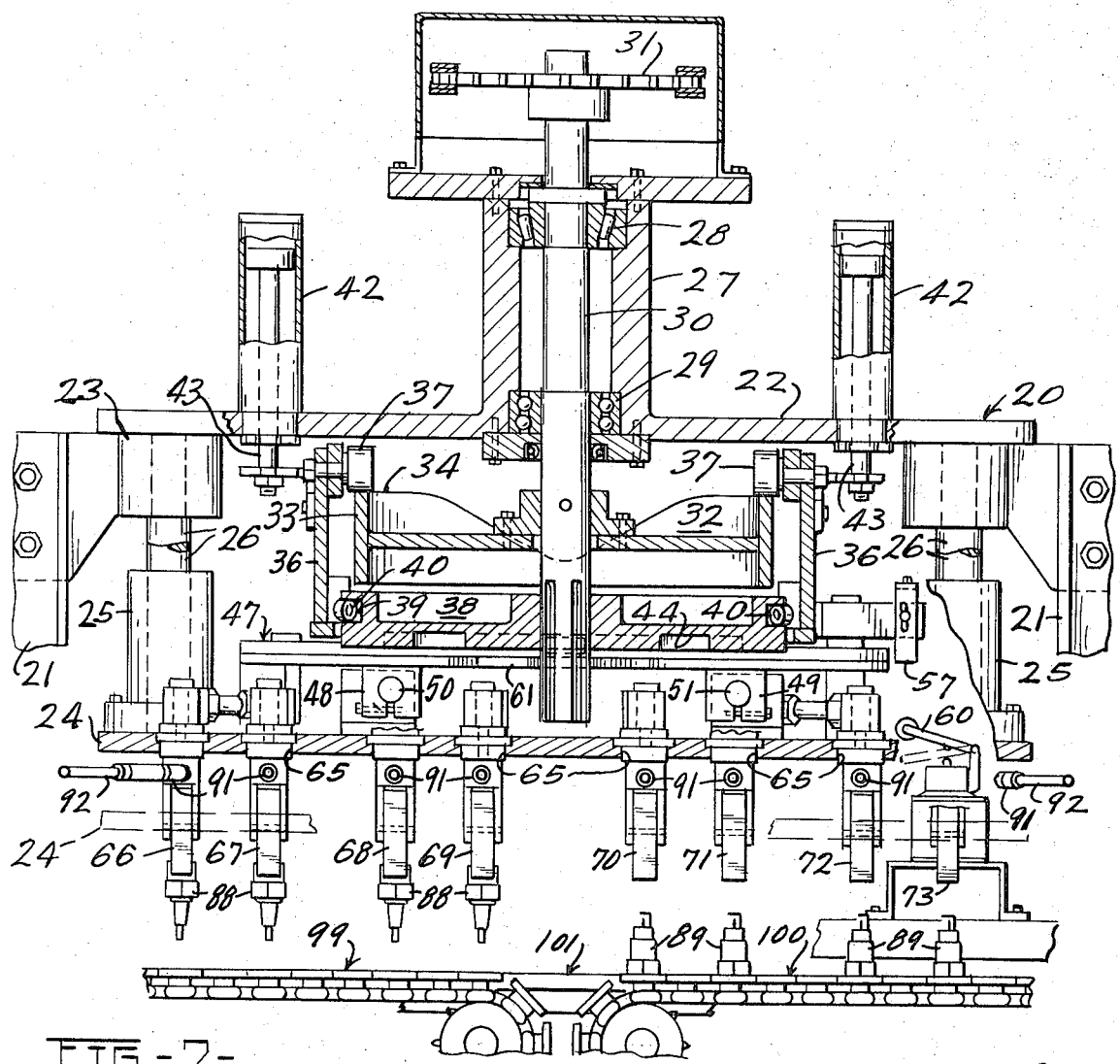
FIG-2-
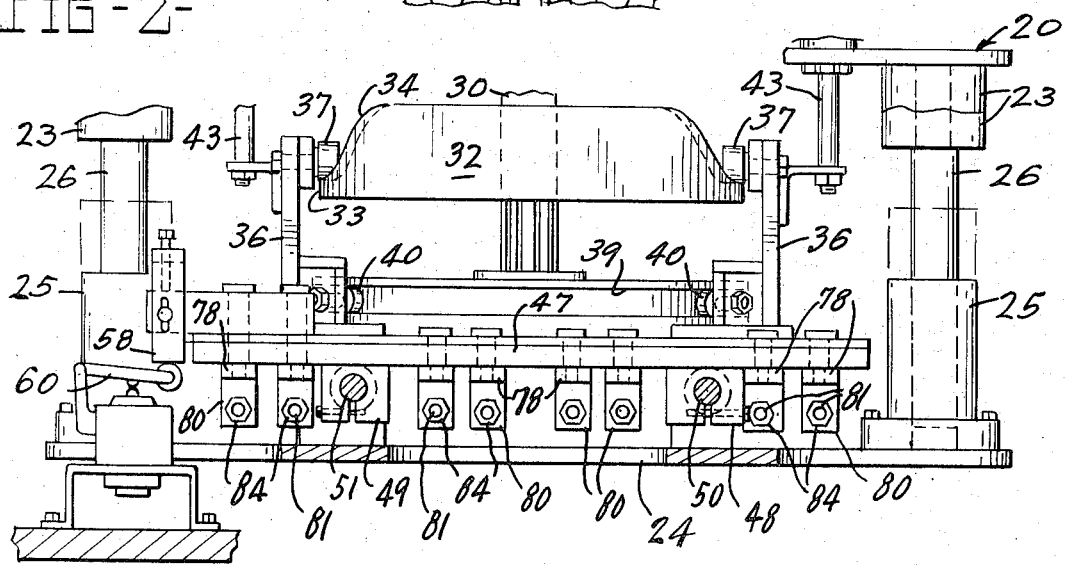
FIG-3-

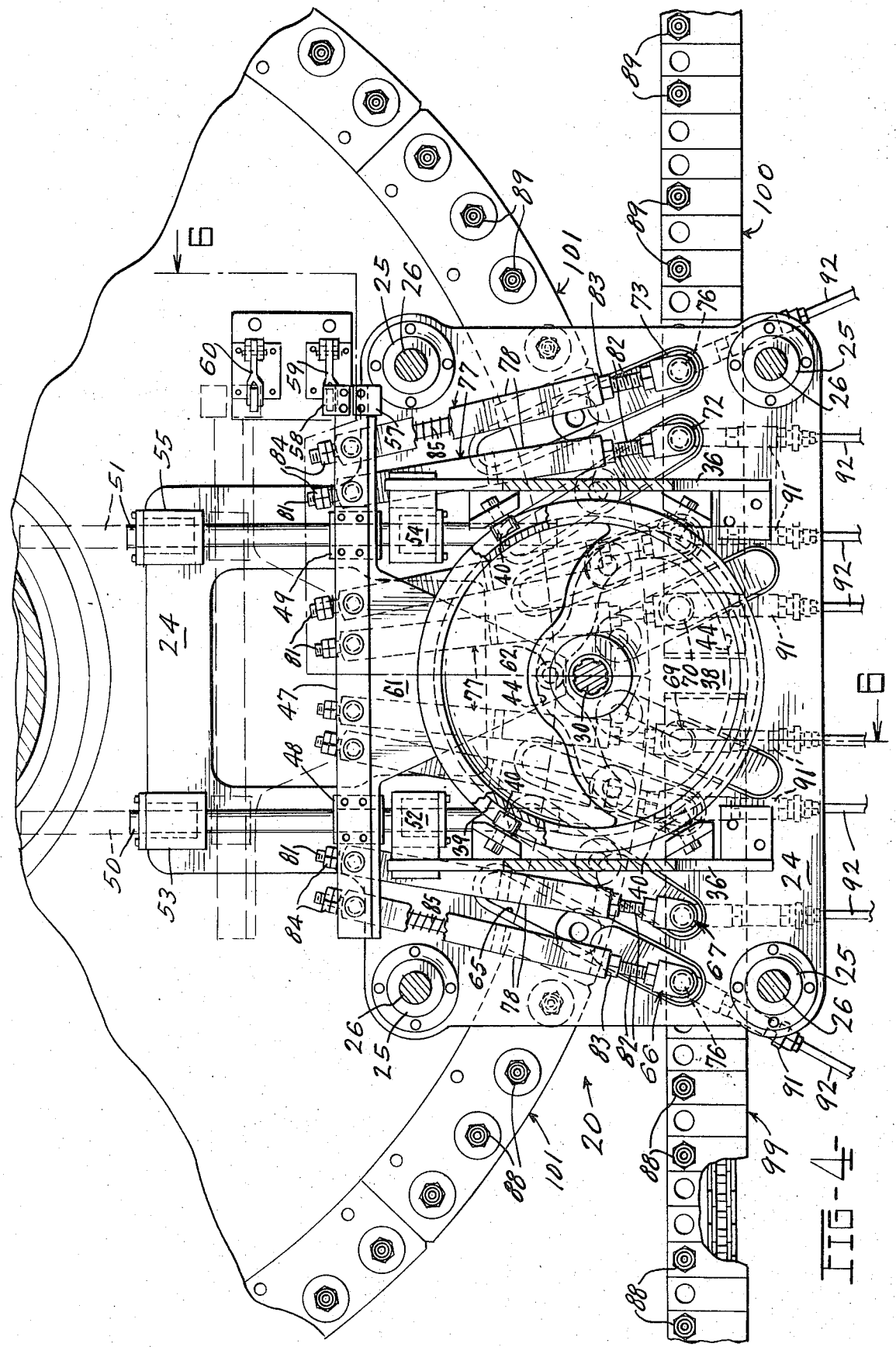

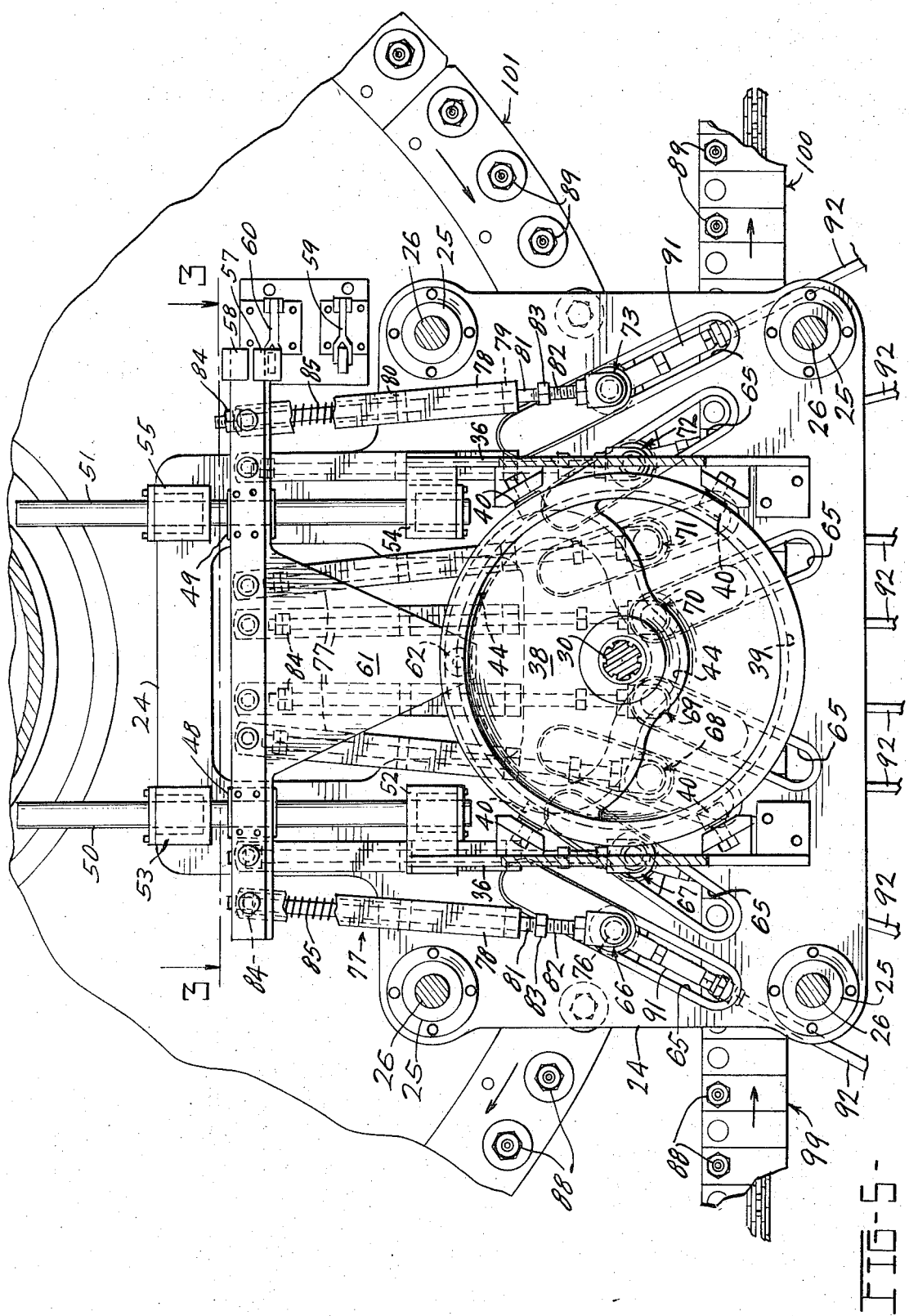

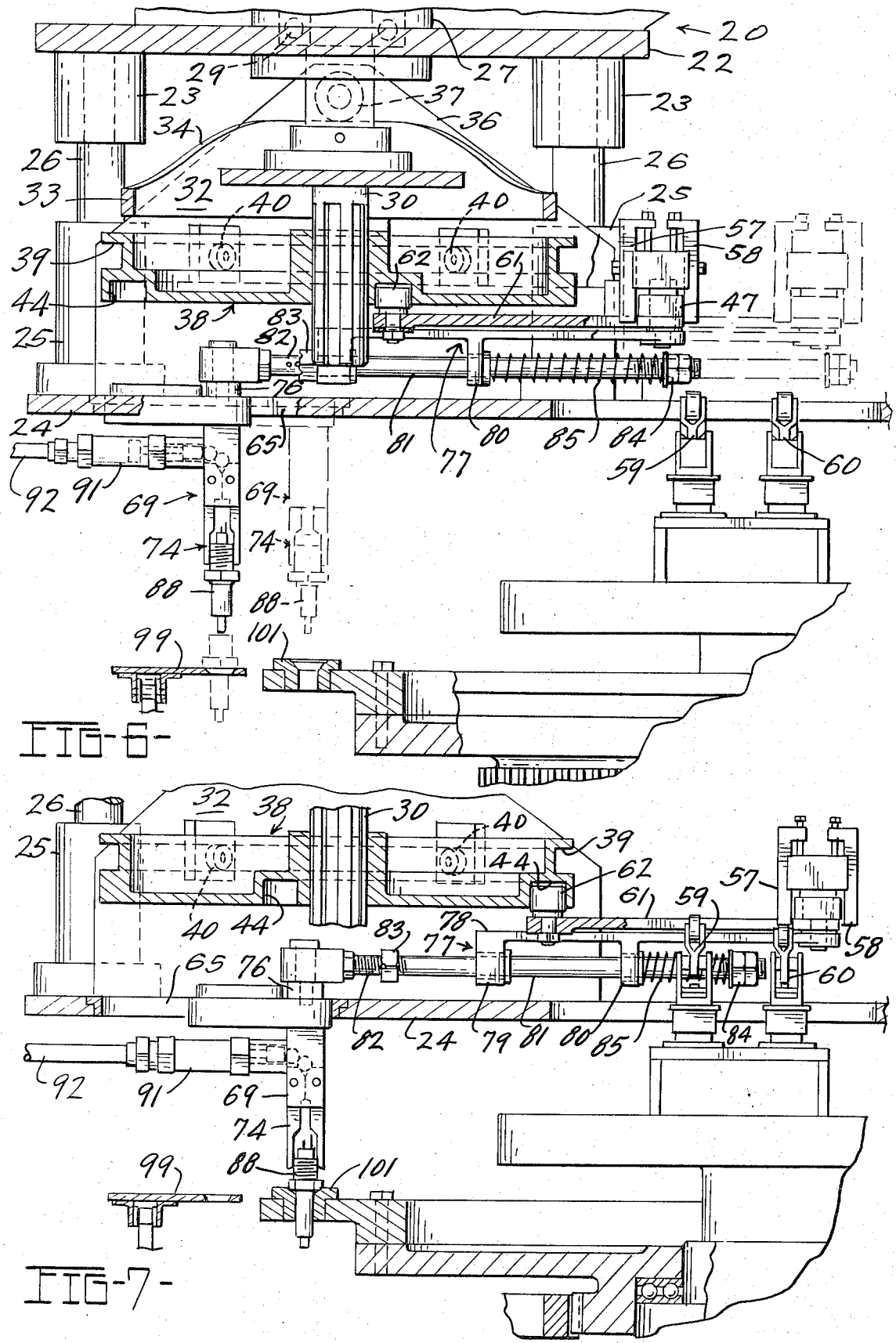

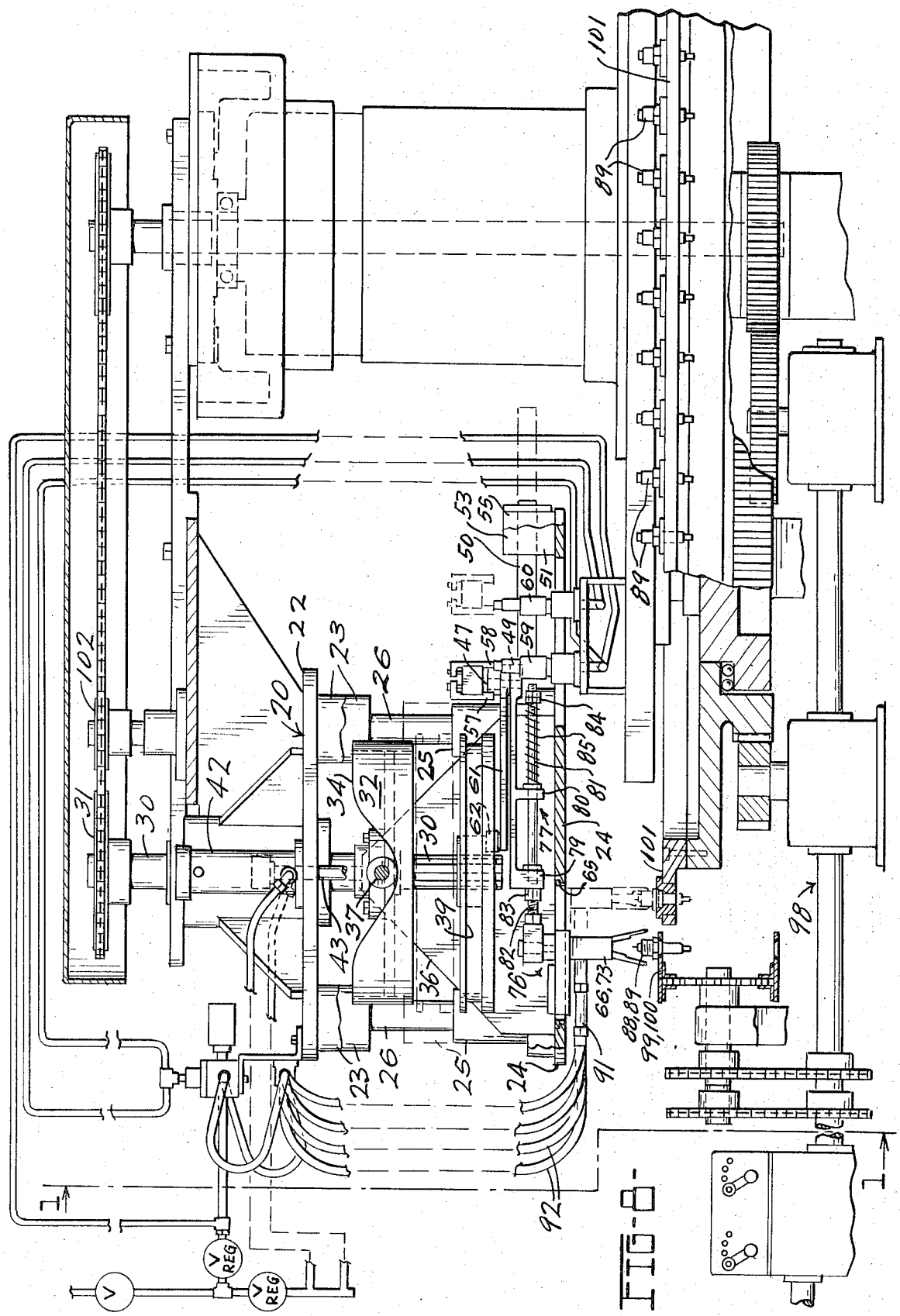

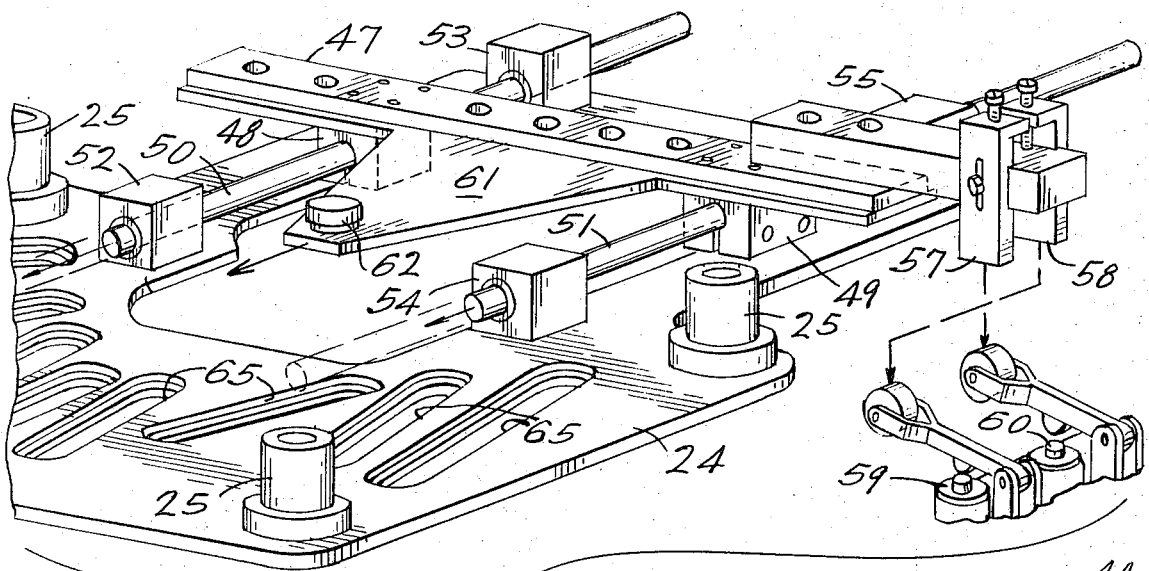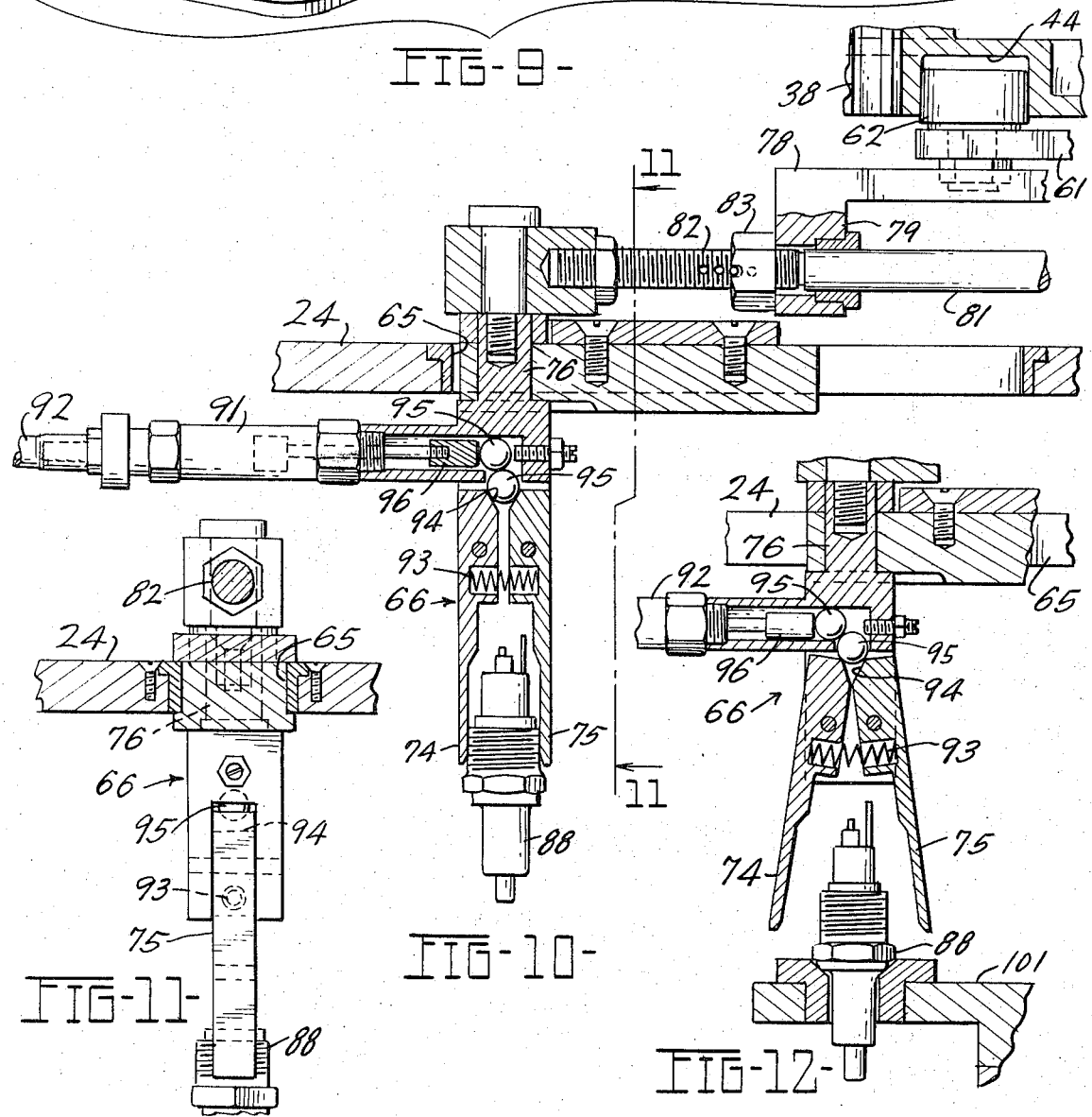

TRANSFER APPARATUS

BACKGROUND OF THE INVENTION

The movement of articles between various work stations in a mass production operation must be both accurate and relatively fast. The problem becomes even more complex when it is necessary to transfer articles from a linear path wherein the articles have one spacing to an arcuate path wherein the spacing of the articles must be changed. After the work operation is completed on the articles, it is also sometimes necessary to again transfer the articles from the arcuate path to another linear path and, at the same time, again change the spacing of the articles relative to one another.

Such apparatus may be utilized in the production of spark plugs. The individual spark plugs must be moved between numerous work stations. In the past, this has sometimes been accomplished manually and at other times accomplished mechanically and electromechanically.

SUMMARY OF THE INVENTION

The present invention relates to transfer apparatus for articles, such as spark plugs, from a linear path to an arcuate path and, in the present embodiment, back to a linear path. The spacing between the articles is also changed.

The transfer apparatus includes an upper cam which is connected to a rotating shaft. The upper cam defines a curvilinear vertical path and supports a lower cam which defines a horizontal path. A lower guide plate having guide slots defined therein is also responsive to the upper cam path. Pick-up heads for grasping and releasing the articles are guided along the guide slots resulting in horizontal translation of the articles and, at the same time, are moved vertically along the path defined by the upper cam.

BRIEF DESCRIPTION OF THE DRAWINGS

FIG. 1 is a side elevational view showing transfer apparatus according to cthe present invention and showing a left-hand workpiece conveyor from which articles are taken and a right-hand workpiece conveyor to which articles are returned;

FIG. 2 is a vertical, sectional view similar to FIG. 1, showing the left-hand pick-up heads immediately after they have raised articles from the left-hand conveyor and showing right-hand pick-up heads immediately after they have deposited articles on the right-hand conveyor;

FIG. 3 is a rear view, partially in cross section, of the transfer apparatus shown in FIG. 1;

FIG. 4 is a horizontal, sectional view taken along the line 4—4 of FIG. 1 and showing the pick-up heads in a forward position;

FIG. 5 is a vertical, sectional view, similar to FIG. 4, showing the pick-up heads moved rearwardly;

FIG. 6 is a fragmentary, vertical sectional view taken along the line 6—6 of FIG. 4 and showing the pick-up heads in a raised position;

FIG. 7 is a view similar to FIG. 6 and showing the pick-up heads in a lowered position;

FIG. 8 is a partially diagrammatic and partially sectional elevational view taken along the line 8—8 of FIG. 1;

FIG. 9 is an exploded view, partially diagrammatic, showing the lower cam follower mechanism and indicating guide mechanism by dashed lines;

FIG. 10 is an enlarged sectional view showing one of the pick-up heads in a closed position;

FIG. 11 is a sectional view taken along the line 11—11 of FIG. 10; and

FIG. 12 is a view similar to FIG. 10, showing the pick-up head in an open position.

DESCRIPTION OF THE PREFERRED EMBODIMENT

A transfer apparatus, according to the present invention, is generally indicated in FIG. 1 by the reference number 20. Frame members 21 mount an upper plate 22 which has depending collars 23. A lower plate 24 having collars 25 mounted on its upper surface is positioned below the upper plate 22. Posts 26 are fixably received by the collars 23 and are mounted for reciprocation within the lower collars 25. Referring to FIG. 2, the upper plate 22 has an upward extending collar 27 which mount inner bearings 28 and 29. A rotatable shaft 30 having a drive sprocket 31 on its upper end is journaled within the bearings 28 and 29. An upper cam 32 having an outer peripheral wall 33 is fixed to the rotatable shaft 30. A cam path 34 is defined by the upper surface of the peripheral wall 33.

Generally vertical support members 36 having cam followers 37 mounted on their upper ends support or carry a lower cam assembly 38 and the lower plate 34. As a result of this support, the lower cam assembly 38, which is keyed to the rotatable shaft 30, and the lower plate 24 are moved vertically in response to the vertical changes in the upper cam path 34. The lower cam assembly 38 defines a horizontal circular groove 39 on its outer periphery. Idler rollers 40 are mounted on the support members 36 and ride within the circular groove 39. The circular groove 39 and idler rollers 40 tend to prevent rocking of the lower cam assembly 38 during rotation of the shaft 30. Counterbalancing cylinders 42 are mounted on the upper plate 22 and have their rods 43 operatively connected to the support members 36. The counterbalancing cylinders 42, which are air operated, insure a smooth vertical travel of the lower cam assembly 38 and the lower plate 24.

The lower cam assembly 38 defines on its lower surface a horizontal cam path 44 indicated by dashed lines in FIGS. 4 and 5. As mentioned above, the lower cam assembly 38 is keyed to the rotatable shaft 30 and rotates with the shaft. However, the lower cam assembly 38 moves vertically with respect to the rotatable shaft 30 in response to travel of the cam followers 37 along the upper cam path 34.

Referring to FIGS. 5 and 9, a header member 47 having depending bearing blocks 48 and 49 is mounted for horizontal reciprocation on horizontal rods 50 and 51 which are carried by mounting blocks 52-55 located on the upper surface of the lower plate 24.

Valve actuators 57 and 58 are mounted on one side of the header member 47 and actuate valves 59 and 60, as will be discussed below.

A follower arm 61 (see FIG. 9) extends outwardly from the header member 47 and mounts at its outermost end a cam follower 62. Referring to FIG. 6, the cam follower 62 is positioned within the lower cam path 44. As the lower cam assembly 38 rotates, the cam follower 62 moves through the lower cam path 44 and the operatively connected header member 47 is reciprocally moved along the rods 50 and 51.

Referring to FIGS. 4, 5 and 9, the lower plate 24 defines a plurality of guide slots 65. A plurality of pick-up heads 66–73 each have pick-up fingers 74 and 75. Upper ends 76 (see FIGS. 10–12) of the pick-up heads 66–73 extend through respective ones of the guide slots 65. A plurality of arm assemblies 77 have one end pivotally connected to the header member 47 and the other end connected to the upper ends 76 of the pick-up heads 66–73. Referring to FIGS. 6 and 7, each of the arm assemblies 77 includes a pivot member 78 having depending bearing shoulders 79 and 80. A guide rod 81 is slidably journaled by the bearing shoulders 79 and 80 and has a threaded end 82 which is attached to the upper end 76 of a respective pick-up head 66–73. An adjustable stop nut 83 is mounted on the threaded end 82 and moves into and out of engagement with the bearing shoulder 80. Nuts 84 are positioned on the opposite end of the guide rod 81 and a compression spring 85 surrounds the guide rod 81 between the bearing shoulder 80 and the nuts 84.

Referring to FIG. 5, the guide slots 65 in the lower plate 24 are positioned at varying angles and locations. The positioning of the respective guide slots 65 depends on the desired spacing of the individual articles and the relative position on the arcuate path. In the present embodiment the articles are groups of spark plugs 88 and 89 (see FIG. 2). Movement of the pick-up heads 66–73 within their respective guide slots 65 provide the necessary horizontal translation to move the spark plugs 88 from the linear path shown in FIG. 2 rearwardly to an arcuate path shown in FIG. 5. At the same time, the spacing between respective ones of the spark plugs 88 are changed. Because the guide slots 65 are of a different angular position, their vectors are different and individual ones of the pick-up heads 66–73 travel different distances. The arm assemblies 77 provide means for horizontally translating the individual spark plugs 88 the required distance while still using the uniform reciprocating path defined by the travel of the header member 47.

Referring to FIG. 6, the pick-up head 69 grasps one of the spark plugs 88 and the header member 47 which is operatively connected to the cam follower 62 begins to move rearwardly. At this time, the stop nut 83 is against the bearing shoulder 79. Referring to FIG. 7, when the pick-up arm reaches the end of its travel and the upper end 76 engages the rearward portion of the respective guide slot 65, relative motion occurs between the pivot member 78 and the guide rod 81. As this occurs, the stop nut 83 and the bearing shoulder 79 separate and the spring 85 begins to compress. The arm assemblies 77 therefore provide a lost motion means enabling each of the arm assemblies 77 to be operated simultaneously by movement of the single header member 47 even though the horizontal translation of the individual pick-up heads 66–73 varies.

Referring to FIGS. 10–12, one embodiment of the pick-up heads 66–73 is shown. The pick-up head 66 is pneumatically operated by an air cylinder 91 which is connected to an air hose 92. The pick-up fingers 74 and 75 are biased apart by a spring 93. A V-shaped seat 94 is defined at the upper end of the mating pick-up fingers 74 and 75. A pair of balls 95 are positioned adjacent the V-shaped seat 94 and are in communication with a plunger 96, which is connected to the rod of the air cylinder 91. Referring to FIG. 12, when it is desired to close the pick-up fingers 74 and 75, air is introduced into the cylinder 91 through the air hose 92. This moves the plunger 96 to the right. As the plunger 96 contacts one of the balls 95, it forces the second ball into the V-shaped seat 94. This force overcomes the force of the spring 93 and the pick-up fingers 74 and 75 are pivoted to their grasping or closed position as shown in FIG. 10.

Drive mechanism is generally indicated by the reference number 98 (see FIG. 8). As shown, the drive mechanism controls a pair of linear conveyors 99 and 100; a rotary turret conveyor 101; and the drive mechanism 102 which is operatively connected to the drive sprocket 31 mounted at the upper end of the rotatable shaft 30. The drive mechanism 98 includes gear reducing mechanism and intermittent drive mechanism and controls for operating the conveyors and the transfer apparatus 20 in relation to one another. In the present embodiment, the mechanism 98 operates in multiples of one hundred and four. However, the drive mechanism 98 may be of many different types or embodiments. For example, the intermittent drive control mechanism may be done electronically or, for example, with a Geneva gear train.

Referring to FIG. 1, during a normal cycle of operation, articles, for example spark plugs 88 having unbent side electrodes, are positioned on a conveyor 99 in a linear array. The spacings between the spark plugs 88 vary. The transfer apparatus 20 provides mechanism for moving the plugs 88 from the conveyor 99 onto the rotary conveyor 101. The rotary conveyor 101 defines an arcuate path of travel for the spark plugs 88 and uniform spacing between the respective plugs. Simultaneously, the transfer apparatus 20 removes spark plugs 89 after the electrode bending process has been completed to the second linear conveyor 100 wherein the spark plugs 89 are again positioned on a linear path with the spacings between the respective spark plugs 89 being different than the spacing on the rotary turret conveyor 101.

Referring to FIG. 6, during the initial pick-up position of the spark plugs 88, the upper cam followers 37 are at the uppermost position on the upper cam path 34. The valve actuator 58 on the header member 47 has engaged the valve 59 to initiate the cycle. As the shaft 30 continues to rotate, the cam followers 37 move downwardly which lowers the pick-up heads 66–69 into grasping position. At this time, the pick-up heads are in the open position shown in FIG. 12. Air is then introduced through the air hose 92 moving the pick-up heads 66–69 to their closed position shown in FIG. 10. The cam followers 37 then begin to move upwardly lifting the spark plugs 88 to the upper forward position shown in FIG. 6. At this time, the lower cam follower 62 is following the lower cam path 34, which has been in a dwell position and the header member 47 begins to move rearwardly. During the rearward movement, the respective guide slots 65, which guide the pick-up heads 66–69, horizontally translate the position of the spark plugs 88 until they have reached the same arcuate configuration and spacing as the rotary turret conveyor 101. This is possible because of the above-described lost motion movement within the arm assemblies 77.

During the above-described cycle, while the pick-up heads 66–69 are moving spark plugs 88 rearwardly to deposit them on the rotary conveyor 101, the pick-up heads 70–73 are moving rearwardly empty after having deposited completed spark plugs 89 on the linear conveyor 100.

Referring to FIG. 7, as the pick-up heads 66–69 move downwardly to deposit their spark plugs 88 on the rotary conveyor 101, the pick-up heads 70–73 move downwardly to grasp completed spark plugs 89. The header member 47 and the actuators 57 and 58 operate the valves 59 and 60 at opposite ends of the reciprocal stroke of the header member 47. The valves 59 and 60 control the air supply to the two banks of pick-up heads 66–69 and 70–73.

The above-described cycle is then reversed with the bank of pick-up heads 70–73 grasping completed spark plugs 89 and returning them to the conveyor 100 while the bank of pick-up heads 66–69 return empty to their initial grasping position above the conveyor 99. The above-described cycle is then repeated.

It has been found that transfer apparatus 20 according to the present invention provides an efficient and accurate method of transferring articles from linear array to an arcuate array and at the same time adjust spaces between the articles.

What I claim is:

1. Transfer apparatus comprising means for grasping a plurality of spaced articles, first cam means operatively connected to said grasping means for vertically moving such articles between one station wherein such articles are spaced from one another at a predetermined spacing and are in a first path and another station wherein such articles have a spacing different from such predetermined spacing and are in a second path, guide and spacing means positioned below said first cam means for horizontally guiding said grasping means and for changing the spacing of such articles and second cam means below said first cam means and operatively connected to said grasping means and said guide and spacing means for horizontally translating such articles between such first path and such second path, said guide and spacing means including a lower generally horizontal plate member, said lower plate member having a plurality of angular guide slots defined therein.

2. Transfer apparatus according to claim 10, including an upper plate member and a rotatable shaft journaled by said upper plate member, said first cam means being connected to said shaft for rotation therewith.

3. Transfer apparatus according to claim 2, wherein said first cam means includes a cylindrical outer wall defining on its top a cam surface which is curvilinear in a vertical direction.

4. Transfer apparatus according to claim 2, wherein said second cam means is keyed to said shaft and rotatable therewith, said second cam means being supported beneath said first cam means and being movable vertically in response to variations in the cam surface of said first cam means, said second cam means defining a horizontal cam path.

5. Transfer apparatus according to claim 1, wherein said grasping means comprise a plurality of pick-up heads, said heads including vertically extending upper ends.

6. Transfer apparatus according to claim 5, wherein said vertically extending upper ends of said heads are received by such angular guide slots.

7. Transfer apparatus according to claim 6, including arm assemblies having first and second ends, said first ends of said arm assemblies being connected to said pick-up heads, and a horizontally movable header member operably connected to said second cam means, said second ends of said arm assemblies being pivotally mounted on said header member.

8. Transfer apparatus according to claim 7, wherein said second cam means defines a horizontal cam path and including a cam follower having one end in communication with said cam path and another end attached to said movable header member.

9. Transfer apparatus comprising means for grasping a plurality of spaced articles, first cam means operatively connected to said grasping means for vertically moving such articles, said grasping means comprising a plurality of pick-up heads, said heads including vertically extending upper ends, guide means positioned below said first cam means for horizontally guiding said grasping means and second cam means below said first cam means and operatively connected to said grasping means and said guiding means for horizontally translating such articles, a horizontal plate member, said guiding means including a plurality of guide slots defined by said plate member, said slots receiving said upper ends of said pick-up heads, arm assemblies having first and second ends, said first ends of said arm assemblies being connected to said pick-up heads, and a horizontally movable header member operatively connected to said second cam means, said second ends of said arm assemblies being pivotally mounted on said header member.

10. Transfer apparatus according to claim 9, wherein said second cam means defines a horizontal cam path and including a cam follower having one end in communication with said cam path and another end attached to said movable header member.

11. Transfer apparatus comprising a frame having a vertical rotatable shaft mounted thereon, means for rotating said shaft, upper cam means mounted on said shaft for rotation therewith, said upper cam means defining a vertically variable cam surface, support members depending from said cam means, said support members including cam followers complementary with said cam surface, a lower cam means operatively carried by said support members and rotatably mounted with said shaft, said lower cam means defining a horizontally variable cam path, a plate member positioned below said lower cam means, said plate member defining a plurality of guide slots, a plurality of pick-up heads having upper portions guided by respective ones of said guide slots, a plurality of arm assemblies having first and second ends, and a horizontally movable header member operatively connected to said lower cam means, said first ends of said arm assemblies being connected to said pick-up heads and said second ends of said arm assemblies being pivotally connected to said header member.

* * * * *

UNITED STATES PATENT OFFICE
CERTIFICATE OF CORRECTION

Patent No. 3,837,472          Dated September 24, 1974

Inventor(s) Dale L. Byerly

It is certified that error appears in the above-identified patent and that said Letters Patent are hereby corrected as shown below:

Column 1, line 43, after "to", the word "cthe" should be corrected to read "the";

Column 5, line 45, after "to", "claim 10" should be corrected to read "claim 1".

Signed and sealed this 26th day of November 1974.

(SEAL)
Attest:

McCOY M. GIBSON JR.          C. MARSHALL DANN
Attesting Officer            Commissioner of Patents